United States Patent Office 3,551,473
Patented Dec. 29, 1970

3,551,473
PREPARATION OF DIAMINOMALEONITRILE BY THE REDUCTION OF DIIMINOSUCCINONITRILE
Donald R. Hartter, Wilmington, Del., assignor to E. I. du Pont de Nemours and Company, Wilmington, Del., a corporation of Delaware
No Drawing. Filed July 19, 1968, Ser. No. 745,955
Int. Cl. C07c 121/42
U.S. Cl. 260—465.5          9 Claims

ABSTRACT OF THE DISCLOSURE

Diaminomaleonitrile (HCN tetramer) is prepared in high yield by the reduction of diaminosuccinonitrile by direct liquid-phase hydrogenation in the presence of a Group VIII transition metal hydrogenation catalyst under mild conditions if desired, e.g., in acetonitrile with a Pd/C catalyst at room temperature and preferably up to 100 atmospheres of hydrogen pressure.

FIELD OF THE INVENTION

This invention relates to, and has as its principal object provision of, the reduction of diiminosuccinonitrile to diaminomaleonitrile by hydrogenation in the presence of Group VIII transition metal hydrogenation catalysts.

BACKGROUND OF THE INVENTION

Diaminomaleonitrile has been known for a considerable time being generally referred to as HCN tetramer since it is available in low yields from HCN polymerization. The compound has the structure

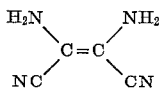

and is a valuable intermediate for the synthesis of various heterocycles, e.g., as shown in U.S. 2,499,441. Heretofore, the compound, although very useful, has not been obtained in high yields and is rather expensive.

Diiminosuccinonitrile has recently been obtained. The latter compound can be converted by chemical reagents to diaminomaleonitrile, e.g., by further reaction with HCN as shown in the copending, coassigned U.S. application of Webster, Ser. No. 707,459, filed Feb. 23, 1968. The prior art does not show successful catalytic reduction of such imines, i.e., α-diimines or bis-imines, actually implying that α-diimines having the structural configuration

as in oxamidines cannot be further reduced [see Woodburn & Hoffman, J. Org. Chem. 23, 263 (1958)].

DESCRIPTION OF THE INVENTION

In spite of the implications of the art, it has now been found that diiminosuccinonitrile can be selectively converted to diaminomaleonitrile in high yields, e.g., up to 98%, by reaction with hydrogen in the presence of a Group VIII transition metal hydrogenation catalyst according to the equation:

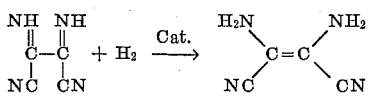

The reaction takes place over wide temperature (e.g., −30° to 150° C.) and hydrogen pressure (e.g., 0.01 to 3000 atmospheres) ranges.

The reaction takes place in liquid phase with a wide range of solvents or diluents that are relatively inert under the conditions employed. Solvents that are useful include alkyl and aryl nitriles such as acetonitrile, propionitrile, benzonitrile; ethers such as tetrahydrofuran, dioxane, glyme, diglyme, ethyl ether; alcohols such as methanol, ethanol, propanols, butanols, pentanols, hexanols; water; aliphatic and aromatic hydrocarbons such as benzene toluene, xylene, pentane, hexanes, petroleum ether; chlorinated hydrocarbons such as methylene chloride, carbon tetrachloride, chloroform, dichloroethane; and carbonyl compounds such as acetone, ethyl acetate, dimethylformamide, dimethylacetamide, dimethylsulfoxide.

Of the above solvents, the nitriles and ethers are preferred with acetonitrile and tetrahydrofuran being especially useful in maintaining the organic reactants in solution.

The amount of hydrogen necessary for the reaction of this invention is equimolar with respect to the diiminosuccinonitrile. It is generally employed in excess quantities to ensure high yields and superatmospheric pressures of up to about 100 atm. are preferred, although pressures of less than one atm. can be used.

The catalysts that are useful in the process of this invention are Group VIII transition metal hydrogenation catalysts containing at least one of Co, Ni, Rh, Ru, Pd or Pt. Particularly useful are the metals themselves, especially palladium, platinum or rhodium, supported on carbon. The supported metal is present in an amount of 5–15% of the catalyst composition. Other hydrogenation catalysts include the metal oxides such as platinum oxide and ruthenium oxide. Nickel supported on siliceous material such as kieselguhr also promotes reduction and can be employed atlhough lower yields may result. The supported metals and the metal oxides promote the reduction smoothly in yields that for the most part are substantially quantitative. A further advantage of such heterogeneous systems is that the reduction products are easily separated from the catalyst.

As shown in an appended example, hydrogenation catalysts that are soluble in conventional organic solvents can be used. Systems in which the catalyst is homogeneous with the reactant are generally less preferred since they are usually effected at considerably higher pressures than heterogeneous systems. However, homogeneous, or soluble, catalysts can be employed in the process of this invention. Additional catalysts of this type are recognized by the literature and include $ClIr(CO)[(C_6H_5)_3P]_2$, $MX_2[(C_6H_5)_3P]_2$, and $MX(CO)[(C_6H_5)_3P]_2$ wherein M is Ir or Rh and X is a halogen; $RhCl[(C_6H_5)_3M]_3$ where M is P, As or Sb; $MCl[(C_6H_5)_3Q]_3$ where M is Ir or Rh and Q is P, As or Sb; and $MX_2(R_3Q)_2$ where M is Ni, Pd, Pt, X is a halogen or CO and Q is P, As or Sb. These are described by Osborn et al., J. Chem. Soc. 1711 1966, Mague et al., J. Chem. Soc. 1736 1966, Vaska et al., J. Am. Chem. Soc. 87, 4970 (1965), and Tayim et al., J. Am. Chem. Soc., 89, 4330 (1967).

The time necessary for the reaction depends upon the activity of the catalyst and the temperature. Times of up to a day or longer are generally not required and a few minutes to a few hours may suffice. Usually room temperature is employed.

The reduction-conversion process generally gives very high yields of diaminomaleonitrile which is readily separated from the catalyst and purified. Because of the ease of separation of the nonsoluble catalysts, continuous operation can readily be achieved, particularly with supported catalysts.

EMBODIMENTS OF THE INVENTION

There follow some nonlimiting examples in which the process of the invention is described in more detail. Temperatures are in degrees Celsius, and percentages are by weight unless otherwise noted.

There follow some nonlimiting examples in which the process of the invention is described in more detail. Temperatures are in degrees Celsius, and percentages are by weight unless otherwise noted.

Example 1

To 200 ml. of acetonitrile in a 500 ml. hydrogenation vessel was added 2.0 g. (19 mmoles) of diiminosuccinonitrile and 200 mg. of 10% Pd/C. The vessel was pressured to 50 p.s.i. of $H_2$ in a Parr shaker. After shaking for 30 minutes at room temperature, $H_2$ consumption ceased (20 mmoles $H_2$). The catalyst was removed by filtration and the filtrate was evaporated to dryness giving 1.98 g. of diaminomaleonitrile (97% yield).

Example 2

A 60 g. portion of diiminosuccinonitrile in 800 ml. of acetonitrile was hydrogenated (in a 1200 ml. Parr shaker vessel) over 6.0 g. of 5% Pd/C at 45° and 1000 p.s.i. Hydrogen consumption ceased after 60 minutes. Removal of the catalyst by filtration and evaporation of the filtrate gave 55 g. of diaminomaleonitrile (90% yield).

Example 3

A solution of 508 g. of diiminosuccinonitrile in 7.2 liters of acetonitrile was hydrogenated over 60 g. of 5% Pd/C in a 12 liter stirred autoclave at 60° C. under 1000 p.s.i. of $H_2$. Hydrogen consumption ceased after 2.75 hours. The catalyst was removed by filtration and the filtrate was evaporataed to give 450 g. of diaminomaleonitrile (87% yield).

Example 4

A solution of 1.0 g. (9.4 mmoles) of diiminosuccinonitrile in 150 ml. of dioxane was hydrogenated in a Parr shaker over 300 mg. of ruthenium oxide ($RuO_2$) at 60° under 50 p.s.i. of $H_2$. Hydrogen consumption ceased after 10 hours (9.5 mmoles $H_2$ consumed). The solution was filtered and evaporation of solvent from the filtrate gave 0.91 g. of diaminomaleonitrile (89% yield).

Example 5

A solution of 1.0 g. (9.4 mmoles) of diiminosuccinonitrile in 150 ml. of tetrahydrofuran was hydrogenated in a Parr shaker over 300 mg. of $PtO_2$ at room temperature under 50 p.s.i. of $H_2$. Hydrogen consumption (9.4 mmoles) ceased after 10 minutes. The catalyst was removed by filtration and the filtrate was evaporated to dryness giving 1.0 g. of diaminomaleonitrile (98% yield).

Example 6

A solution of 2 g. of diiminosuccinonitrile, 0.5 g. of $ClRh[(C_6H_5)_3P]_3$ in 150 ml. of acetonitrile was reacted with hydrogen under 1000 atm. pressure at 60° for 12 hours. Hydrogen uptake was complete in about 2 hours. The product formed was diaminomaleonitrile. When catalyst was omitted, this product could not be dected.

Example 7

When the general reaction conditions of Example 1 were employed except hydrogen was introduced at room temperature and atmospheric pressure, that hydrogenation was complete in 1.5 hour. Similarly, at −15° and 35 p.s.i., hydrogenation took place in about 0.75 hour.

The following table summarizes additional examples wherein 1 g. of diiminosuccinonitrile in 150 ml. of solvent was reacted with hydrogen under 50 p.s.i. for generally ½ hour to 2 hours at room temperature with generally 100 mg. of catalyst to give high yields of diaminomaleonitrile.

TABLE

| Example | Solvent | Catalyst |
| --- | --- | --- |
| 8 | Dioxane/acetic acid (2/1) | 5% rhodium/carbon. |
| 9 | Dioxane | 10% palladium/carbon. |
| 10 | Glyme | Do. |
| 11 | Acetic Acid | Do. |
| 12 | Acetonitrile/water (1/1) | Do. |
| 13 | do | 5% platinum/carbon. |
| 14 | do | 5% rhodium/carbon. |
| 15 | Ethanol | 10% palladium/carbon. |
| 16 | Methanol | Nickel/kieselguhr. |
| 17 | Ethyl acetate | 10% palladium/carbon. |
| 18 | Acetone | Do. |
| 19 | Ethyl ether | Do. |
| 20 | Methylene chloride | Do. |

The diiminosuccinonitrile employed in the preceding examples is readily available by reaction of cyanogen and hydrogen cyanide in the presence of a basic catalyst, such as an alkali metal cyanide or other compounds that have a pH of over 7 in aqueous media, at a temperature of −80° to 10° C., preferably −15° to 0°. As an illustration of this process, 22.5 g. of hydrogen cyanide, 19.4 g. of cyanogen and 100 ml. of acetonitrile was cooled to −10° and 1 g. of potassium cyanide added. After 4 hours at about this temperature, the reaction mixture was cooled to −40° and filtered. The filtrate was washed with ice-cold water to give 22 g. of diiminosuccinonitrile.

Since obvious modifications and equivalents in the invention will be evident to those skilled in the chemical arts, I propose to be bound solely by the appended claims.

The embodiments of the invention in which an exclusive property or privilege is claimed are defined as follows:

1. The process of preparing diaminomaleonitrile which comprises
   reducing diiminosuccinonitrile with hydrogen
   in an inert diluent
   in the presence of a catalytic amount of a hydrogenation catalyst containing, as the catalytically effective material, at least one of the Group VIII metals Co, Ni, Ru, Rh, Pd or Pt,
   at a temperature of about −30° to 150° C. and
   a hydrogen pressure of about 0.01 to 3000 atmospheres.

2. The process of claim 1 in which the inert diluent is a liquid organic nitrile.

3. The process of claim 1 in which the inert diluent is acetonitrile.

4. The process of claim 1 in which the inert diluent is a liquid organic ether.

5. The process of claim 1 in which the catalyst is supported by an inert support.

6. The process of claim 1 in which the catalyst is a catalyst soluble in the diluent.

7. The process of claim 1 in which the catalyst is palladium.

8. The process of claim 1 in which the catalyst is nickel.

9. The process of claim 1 in which the catalyst is platinum.

References Cited

UNITED STATES PATENTS 2,499,441   3/1950   Woodward _____ 260—465.5
2,722,540   11/1955  Carter _____ 260—465.5

JOSEPH P. BRUST, Primary Examiner